(12) United States Patent
Yeom et al.

(10) Patent No.: US 9,965,779 B2
(45) Date of Patent: May 8, 2018

(54) DYNAMIC CONTENT DISPLAY TIME ADJUSTMENT

(71) Applicant: Google Inc., Mountain View, CA (US)

(72) Inventors: Jaehyun Yeom, Mountain View, CA (US); Dong Ha Lee, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 14/630,071

(22) Filed: Feb. 24, 2015

(65) Prior Publication Data
US 2016/0247207 A1    Aug. 25, 2016

(51) Int. Cl.
*G06Q 30/02* (2012.01)

(52) U.S. Cl.
CPC ......... *G06Q 30/0272* (2013.01); *G06Q 30/02* (2013.01)

(58) Field of Classification Search
CPC .......................... G06Q 30/02; G06Q 30/0272
See application file for complete search history.

(56) References Cited

U.S. PATENT DOCUMENTS

| | | | | |
|---|---|---|---|---|
| 8,806,655 | B1* | 8/2014 | Brownell | H04L 63/10 726/27 |
| 2007/0073579 | A1* | 3/2007 | Immorlica | G06Q 30/0267 705/14.47 |
| 2011/0067093 | A1* | 3/2011 | Kamada | G06F 21/10 726/7 |
| 2011/0307354 | A1 | 12/2011 | Erman et al. | |
| 2012/0136714 | A1* | 5/2012 | Nesamoney et al. | 705/14.43 |
| 2012/0143660 | A1 | 6/2012 | Jiwang et al. | |

(Continued)

FOREIGN PATENT DOCUMENTS

| | | | |
|---|---|---|---|
| CN | 103218195 | 7/2013 | |
| WO | WO-00/68851 | 11/2000 | |
| WO | WO-2017053601 A1 * | 3/2017 | ......... G06F 3/04842 |

OTHER PUBLICATIONS

D. Reddig, J. Karreman and T. van der Geest, "Watch out for the preview: The effects of a preview on the usability of a Content Management System and on the users' confidence level," 2008 IEEE International Professional Communication Conference, Montreal, QC, 2008, pp. 1-7. (Year: 2008).*

(Continued)

*Primary Examiner* — James M Detweiler
*Assistant Examiner* — Patrick Kim
(74) *Attorney, Agent, or Firm* — Foley and Lardner LLP

(57) ABSTRACT

A content delivery provider may stream an application to each of a plurality of computing devices. The content delivery provider may transmit an offer to download the application to each of the plurality of computing devices, after a first initial display interval. The provider may receive a number of positive user interactions with the offer after the first initial display interval, and a total number of positive user interactions with the offer. The provider may automatically adjust the initial display interval by a factor proportional to a desired first-display quantile divided by the number of positive user interactions after the first initial display interval. The application may be streamed to a second computing device, and the offer to download the application transmitted to the second computing device, after the adjusted initial display interval.

14 Claims, 8 Drawing Sheets

(56) References Cited

U.S. PATENT DOCUMENTS

2013/0304565 A1   11/2013  Saccoman
2013/0339901 A1*  12/2013  Kirkham et al. ............. 715/810
2014/0047005 A1   2/2014  Radar
2014/0316899 A1   10/2014  McGowan et al.
2015/0025964 A1*  1/2015  Awati ................. G06Q 30/0251
                                                                        705/14.49

OTHER PUBLICATIONS

International Search Report & Written Opinion on PCT/US2016/014838 dated Mar. 31, 2016.

* cited by examiner

DYNAMIC CONTENT DISPLAY TIME ADJUSTMENT

Items of content, such as advertisements or offers, may be delivered to and/or displayed periodically by computing devices until a user of the device takes an action to acknowledge or accept the content. In one instance, a demonstration or trial version of an application may be executed by the device, with offers to download or purchase the full version of the application periodically displayed. In a similar instance, a full version of an application may be executed on a remote computing device and streamed to the device, allowing a user to try the application prior to downloading and/or installing the application. This may allow investigation of whether the application will execute smoothly on the device, whether the application has desirable features, etc., prior to spending time, bandwidth, or money to download and install the application.

SUMMARY

Executing an application on a remote computing device and streaming a display of the application to the user's device may require significant amounts of resources of the remote computing device (e.g. memory, processing time, electricity, bandwidth, etc.), particularly as the number of users and client devices trying the application increase. To limit the amount of resources used for streaming the application, an offer or advertisement or similar item of content may be periodically displayed by the user's device, requesting the user to choose to install or purchase the application, end the preview or trial of the application, or continue the trial period. If the periodic message is displayed too frequently, users may be annoyed or frustrated. However, if the periodic message is displayed too infrequently, resources of the remote computing device may be wasted, as the user may have been willing to select to download the application at an earlier time.

Time intervals for periodic display of content, such as advertisements or offers, may be dynamically adjusted based on response rates of users. Some users may determine they are interested in the displayed content or corresponding application and wish to accept the offer within fifteen seconds, while other users may require a minute, two minutes, or longer before they decide to accept the offer, and download, purchase, or otherwise obtain the application or offered item, or cancel previewing the application. Presenting such content every fifteen seconds would capture the positive responses from the first group, but likely heavily irritate the second group. Accordingly, presentation times of content may be dynamically adjusted based on monitored acceptance/dismissal rates to optimize the rate of positive responses according to a predetermined target response rate, and to avoid displaying the content at times when users are less likely to respond positively. Specifically, if the number of positive responses at a particular content presentation time is lower than a target response rate, the interval before showing the content may be extended, potentially reducing user frustration. Conversely, if the number of positive responses is higher than the target, the interval before showing the content may be reduced, potentially reducing unnecessary consumption of server resources.

Although primarily described in terms of server-executed and streamed applications for preview by a client device, with repeated displays of offers to download, purchase, or otherwise obtain the applications, the systems and methods discussed herein may be applied to any sort of periodic display of an item of content that a user may accept or postpone/dismiss, with the content displayed again at a subsequent time. In one implementation, the item of content may be a pop-up window on an installed application executing in a trial or demonstration mode that provides a link to purchase the application or enter a separately-obtained license code, sometimes referred to as an "offer screen." In another implementation, the item of content may be an interstitial or banner advertisement displayed in a streaming media application or on a website providing streaming media, such as an advertisement to purchase a streamed video, television program, song, album, movie, or other such streamed content, and/or content related to streamed content, such as other works by the same artist/producer. Accordingly, the description herein may refer to a first item of content such as a trial or demonstration application, streamed preview of an application, locally-executing application, streamed or locally-played media, or other such content; and an interactive second item of content such as an offer, advertisement, link, survey, or other such content, displayed one or more repeated times until a user accepts or provides a positive response to the second item of content. By dynamically adjusting display times, user frustration may be reduced while increasing approval rates.

One implementation disclosed herein is a method for determining an initial interval for display of an offer to download a streaming application. The method includes streaming to each of a plurality of computing devices, by a content delivery provider executed by a first computing device, an application executed by the first computing device on behalf of each of the plurality of computing devices. The method also includes transmitting, by the content delivery provider, an offer to download the application to each of the plurality of computing devices, after a first initial display interval comprising a predetermined time between beginning streaming of the application and display of the offer. The method further includes receiving a number of positive user interactions with the offer after the first initial display interval, and a total number of positive user interactions with the offer. The method also includes adjusting the initial display interval by a factor proportional to a desired first-display quantile divided by the number of positive user interactions after the first initial display interval. The method also includes streaming the application executed by the first computing device to a second computing device; and transmitting the offer to download the application to the second computing device, after the adjusted initial display interval.

In some implementations, the method includes retransmitting the offer to a subset of the plurality of computing devices after a second display interval comprising a second predetermined time between transmitting the offer and retransmitting the offer, by the content delivery provider, responsive to not receiving a positive user interaction with the offer after the first initial display interval. In a further implementation, the method includes receiving, by the content delivery provider, a number of positive user interactions with the offer after the second display interval; and adjusting the initial display interval further includes increasing the initial display interval by the second display interval multiplied by the desired first-display quantile divided by a sum of the number of positive user interactions with the first transmission of the offer and the number of positive user interactions with the second transmission of the offer. In a still further implementation, the method includes retransmitting the offer to a second subset of the plurality of computing devices after a third display interval, by the content delivery provider, responsive to not receiving a user interaction with the offer after the second initial display interval; receiving, by the content delivery provider, a number of positive user interactions with the offer after the third display interval; and adjusting the initial display interval further comprises increasing the initial display interval by the second display interval plus the third display interval multiplied by the desired first-display quantile divided by a sum of the number of positive user interactions with the first transmission of the offer, the number of positive user interactions with the second transmission of the offer, and the number of positive user interactions with the third transmission of the offer.

In some implementations, the method includes determining, by the content delivery provider, that the received number of positive user interactions with the offer after the first display interval divided by the total number of positive user interactions with the offer is less than a predetermined first-display interaction ratio; and adjusting the initial display interval is performed responsive to the determination.

In other implementations, the desired first-display quantile comprises a predetermined first-display interaction ratio multiplied by the total number of positive user interactions with the offer. In still other implementations, the method includes determining, by the content delivery provider, that the total number of positive user interactions with the offer is greater than an optimization data threshold. In yet other implementations, the method includes determining, by the content delivery provider, that the adjusted initial display interval does not exceed an upper or lower boundary; and transmitting the offer to the second computing device, after the adjusted initial display interval, is performed responsive to the determination.

In another aspect, the present disclosure is directed to a system for determining an initial interval for display of an offer to download a streaming application, comprising a first computing device in communication with a plurality of client computing devices via a network interface of the first computing device, the first computing device executing a virtualization engine and a content delivery server. The virtualization engine is configured for streaming to each of the plurality of computing devices an application executed by the virtualization engine on behalf of each of the plurality of computing devices, and transmitting an offer to download the application to each of the plurality of computing devices, after a first initial display interval comprising a predetermined time between beginning streaming of the application and display of the offer. The content delivery server is configured for receiving a number of positive user interactions with the offer after the first initial display interval, and a total number of positive user interactions with the offer, and adjusting the initial display interval by a factor proportional to a desired first-display quantile divided by the number of positive user interactions after the first initial display interval. The virtualization engine is further configured for streaming the application executed by the virtualization engine to a second computing device, and transmitting the offer to download the application to the second computing device, after the adjusted initial display interval.

In some implementations, the virtualization engine is further configured for retransmitting the offer to a subset of the plurality of computing devices after a second display interval comprising a second predetermined time between transmitting the offer and retransmitting the offer, responsive to not receiving a user interaction with the offer after the first initial display interval. In a further implementation, the virtualization engine is further configured for receiving a number of positive user interactions with the offer after the second display interval; and the content delivery server is configured for increasing the initial display interval by the second display interval multiplied by the desired first-display quantile divided by a sum of the number of positive user interactions with the first transmission of the offer and the number of positive user interactions with the second transmission of the offer. In a still further implementation, the virtualization engine is further configured for retransmitting the offer to a second subset of the plurality of computing devices after a third display interval, responsive to not receiving a user interaction with the offer after the second initial display interval, and receiving a number of positive user interactions with the offer after the third display interval; and the content delivery server is further configured for increasing the initial display interval by the second display interval plus the third display interval multiplied by the desired first-display quantile divided by a sum of the number of positive user interactions with the first transmission of the offer, the number of positive user interactions with the second transmission of the offer, and the number of positive user interactions with the third transmission of the offer.

In some implementations, the content delivery server is further configured for determining that the received number of positive user interactions with the offer after the first display interval divided by the total number of positive user interactions with the offer is less than a predetermined first-display interaction ratio; and adjusting the initial display interval is performed responsive to the determination. In other implementations, the desired first-display quantile comprises a predetermined first-display positive interaction ratio multiplied by the total number of positive user interactions with the offer. In still other implementations, the content delivery server is further configured for determining that the total number of positive user interactions with the offer is greater than an optimization data threshold. In yet still other implementations, the content delivery server is further configured for determining that the adjusted initial display interval does not exceed an upper or lower boundary; and transmitting the offer to the second computing device, after the adjusted initial display interval, is performed responsive to the determination.

In yet another aspect, the present application is directed to a computer-readable storage medium storing instructions that when executed by one or more data processors, cause the one or more data processors to perform operations comprising streaming, to each of a plurality of computing devices, an application on behalf of each of the plurality of computing devices; and transmitting an offer to download the application to each of the plurality of computing devices, after a first initial display interval comprising a predetermined time between beginning streaming of the application and display of the offer. Execution of the instructions also cause the one or more data processors to receive a number of positive user interactions with the offer after the first initial display interval, and a total number of positive user interactions with the offer; and adjust the initial display interval by a factor proportional to a desired first-display quantile divided by the number of positive user interactions after the first initial display interval. Execution of the instructions also cause the one or more data processors to stream the application to a second computing device, and transmit the offer to download the application to the second computing device, after the adjusted initial display interval.

In one implementation, execution of the instructions further cause the one or more data processors to retransmit the offer to a subset of the plurality of computing devices after a second display interval comprising a second predetermined time between transmitting the offer and retransmitting the offer, responsive to not receiving a positive user interaction with the offer after the first initial display interval. In a further implementation, execution of the instructions further cause the one or more data processors to receive a number of positive user interactions with the offer after the second display interval, and increase the initial display interval by the second display interval multiplied by the desired first-display quantile divided by a sum of the number of positive user interactions with the first transmission of the offer and the number of positive user interactions with the second transmission of the offer. In a still further implementation, execution of the instructions further cause the one or more data processors to retransmit the offer to a second subset of the plurality of computing devices after a third display interval, responsive to not receiving a user interaction with the offer after the second initial display interval; receive a number of positive user interactions with the offer after the third display interval; and increase the initial display interval by the second display interval plus the third display interval multiplied by the desired first-display quantile divided by a sum of the number of positive user interactions with the first transmission of the offer, the number of positive user interactions with the second transmission of the offer, and the number of positive user interactions with the third transmission of the offer.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

In some implementations, time intervals for periodic display of interactive items of content, sometimes referred to as display intervals or intervals between display of the items of content (or between launch of an application and an initial display of the item of content, sometimes referred to as an initial display interval), may be dynamically adjusted based on monitored acceptance and dismissal or postponement rates to optimize the rate of positive responses according to a predetermined target response rate, and to avoid displaying the content at times when users are less likely to respond positively. Specifically, if the number of positive responses at a particular content presentation time is lower than a target response rate, the interval before showing the content may be extended, potentially reducing user frustration. Conversely, if the number of positive responses is higher than the target, the interval before showing the content may be reduced, potentially reducing unnecessary consumption of server resources.

In some implementations, an application may be executed by a server or remote computing device and streamed for preview by a client device. Such an application may be referred to as a first item of content. In other implementations, the first item of content may comprise streamed audio, streamed video, an application executing in a trial or demonstration mode, a downloaded application, a website such as a news provider or blog, or any other such content. An interactive second item of content may be periodically displayed on the client device with an option to accept or provide a positive response to the second item of content. In some implementations, the second item of content may be an offer or advertisement to purchase, download, or unlock the first item of content, or an offer to purchase, download, or unlock an item of content related to the first item of content, such as additional downloadable content, access to a full article on a news site, an album related to a currently playing song, or any other such content. If the user does not positively respond to the second item of content or accept the offer, or if the user responds negatively to the second item of content or ignores the second item of content, the device may cease or terminate display of the second item of content, and subsequently redisplay the second item of content after a determined time interval.

Figure 1B:
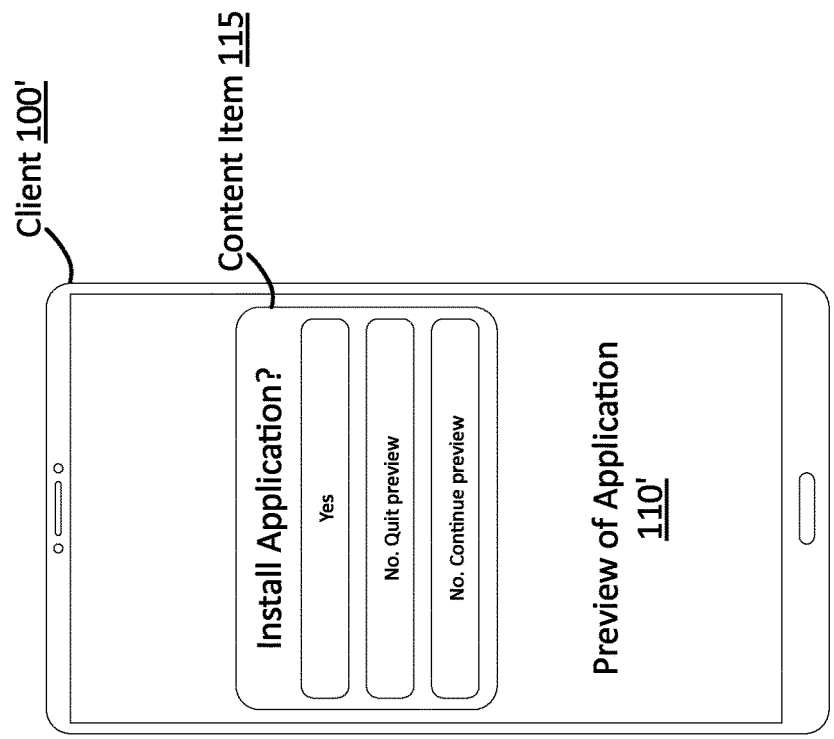
FIG. 1B is an illustration of an implementation of a computing device displaying a second item of content comprising an interactive dialog, over the preview of the streamed application of FIG. 1A.
Figure 1A:
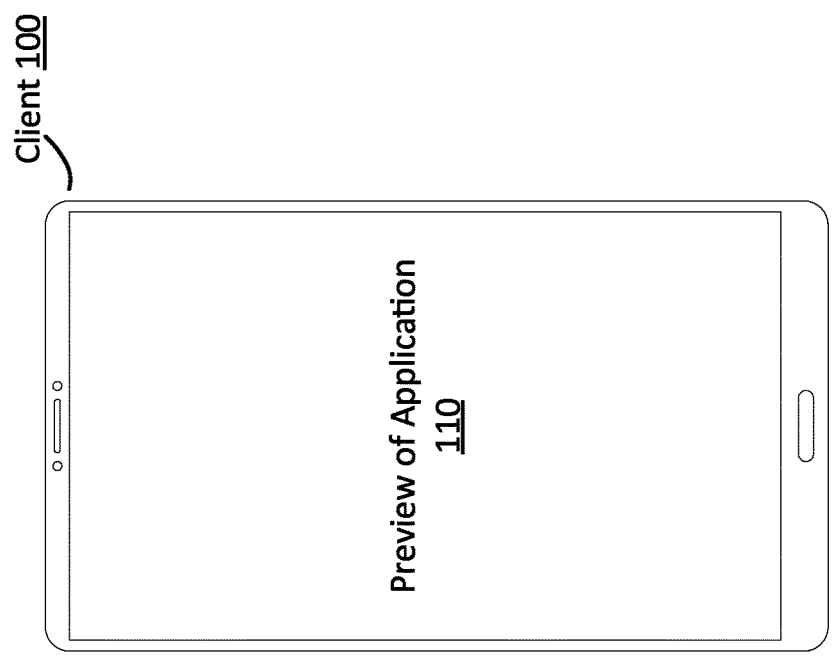
FIG. 1A is an illustration of an implementation of a computing device displaying a first item of content comprising a preview of a streamed application.

FIG. 1A is an illustration of an implementation of a client computing device 100 displaying a first item of content 110 comprising a preview of a streamed application. In some implementations, the streamed application may be executed by a second computing device or devices (not illustrated), such as a server, server farm, server cloud, or other such devices. In some implementations, the streamed application may be executed by a virtual machine executed by a physical machine or server on behalf of the client device. Streaming the application to the client device may comprise providing a remote desktop session or similar presentation session, with images, video, and/or audio generated by the streamed application transmitted to the client device 100 for display, and corresponding interactions (e.g. mouse, touch, or other input device selections; text, audio, or image entry, or other such interaction) of a user with the client device transmitted to the device executing the streamed application to be provided to the application.

As streaming applications may consume server resources including processing cycles, memory, bandwidth, and electricity, particularly as the number of users utilizing the streamed application increases, an interactive second item of content or message may be periodically displayed by the client device to allow the user to download and/or purchase the streamed application or stop previewing or streaming the application, or continue the trial period. In some implementations, such a second item of content may be constantly displayed, such as via a banner or other user interface element. However, in other implementations as shown in FIG. 1A, the streamed application may be displayed in a full-screen mode. In such a mode, the display may not include space to constantly display a banner or other interface element to allow the user to download the application or cease streaming. Accordingly, in such implementations, a periodic "offer screen" or second item of content may be transmitted to the client device or generated on the client device and displayed, to encourage the user to download and/or purchase the streamed application or stop previewing or streaming the application. FIG. 1B is an illustration of an implementation of a client computing device 100' displaying a second item of content 115 comprising an interactive dialog, over a preview of a streamed application 110'. The second item of content 115 may be a pop-up window, an overlay, or other such interface element, and may include a selectable element to accept an offer to purchase the first item of content 110', download the first item of content 110' for local execution, or purchase a related item of content as discussed above. In some implementations as shown the second item of content 115 may include another selectable element to dismiss the second item of content and continue preview or use of the first item of content 110'. In other implementations, the second item of content 115 may be dismissed responsive to no user interaction with the second item of content 115 within a period of time, such as 5, 10, or 15 seconds (sometimes referred to as a wait timer). In still other implementations, the second item of content 115 may include another selectable element to exit or stop streaming of the first item of content 110'. Accordingly, the user may select to purchase, download or unlock the first item of content or a related item of content, dismiss the offer for a period of time, or cease use of the first item of content.

Figure 1C:
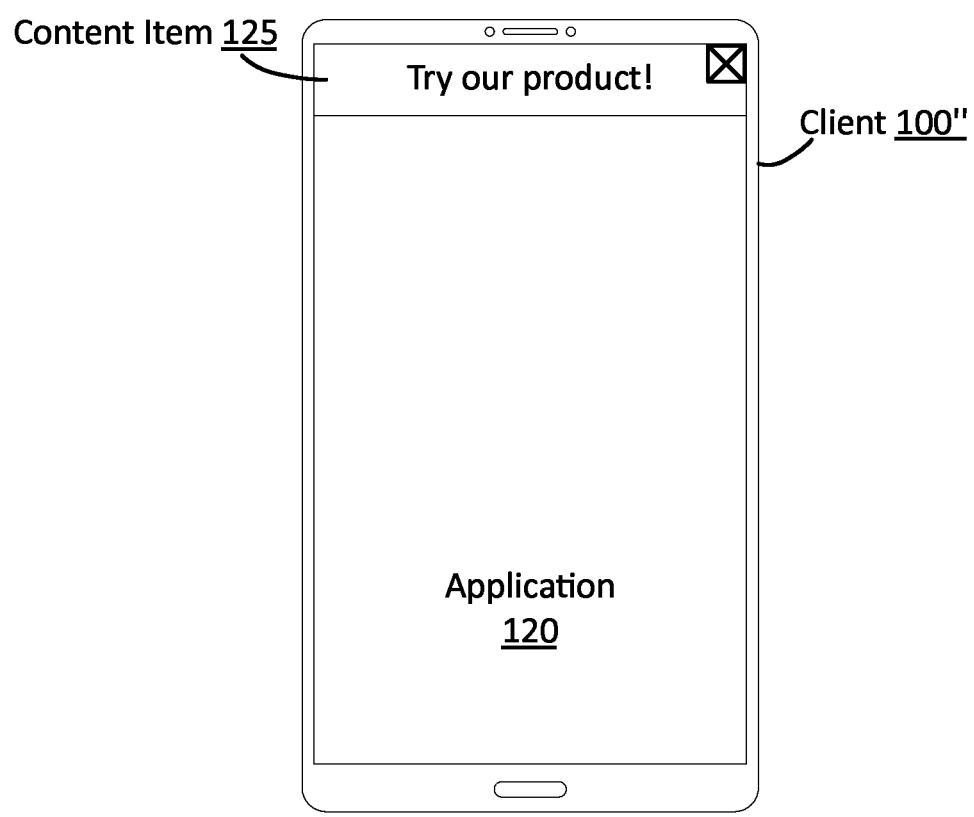
FIG. 1C is an illustration of an implementation of a computing device displaying a locally-executing application and a second item of content comprising a banner advertisement.

As discussed above, periodic offers or content may also be displayed with locally-executing content or non-streamed content. FIG. 1C is an illustration of an implementation of a computing device 100" displaying a locally-executing application 120 and a second item of content 125 comprising a banner advertisement. In some implementations, the second item of content 125 may be displayed periodically, such as being "slid" in from an edge of the display, and retracted similarly after a time period with no interaction.

Some users may respond quickly to offers or determine quickly while using a trial mode of an application or preview of a streamed application that they are interested in purchase/download/unlocking of the content, while others may require significantly more time. Accordingly, given a display of an offer or second item of content at a first time period, a first subset of users (e.g. the former group) may accept or respond positively to the second item of content, while a second subset of users (e.g. the latter group) may respond negatively or not respond at all. Upon acceptance of the offer by the first group, the application or first item of content may be downloaded or provided to devices of the first group, and no further offers of said content are necessary to the first group. However, the second item of content or offer may be provided to the second subset of users again, after a delay interval. Again, a portion of the second subset may respond positively, while another portion does not respond or responds negatively. This may be repeated iteratively until all users have either responded positively or ceased using the first item of content. If the periodic offer is displayed too frequently, users may be annoyed or frustrated. However, if the periodic message is displayed too infrequently, resources of the remote computing device may be wasted, as the user may have been willing to select to download the application at an earlier time.

Figure 1D:
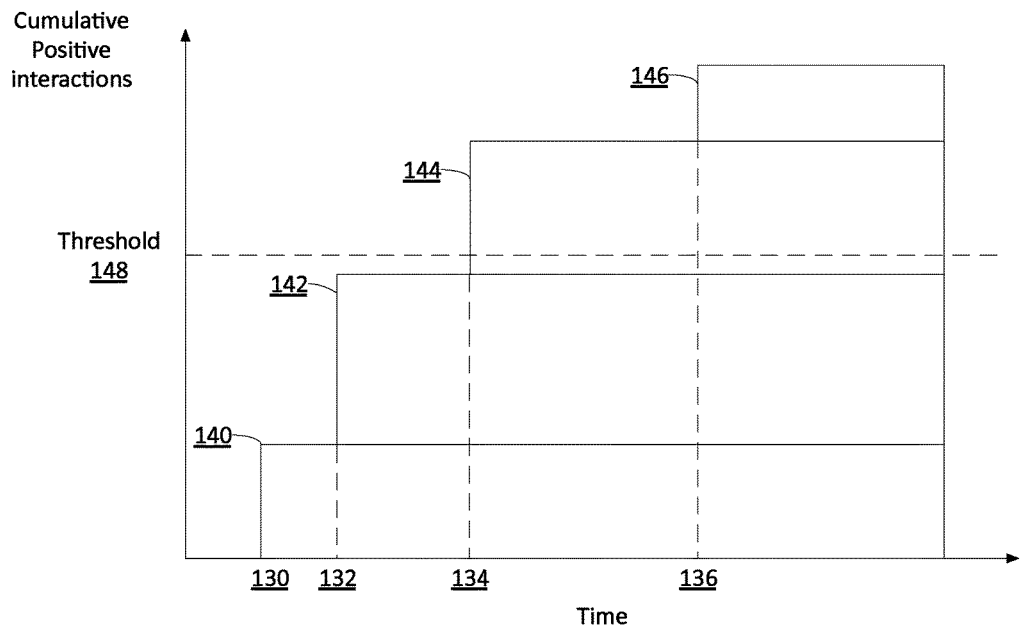
FIG. 1D is a graph of positive interactions with an item of content by a plurality of users at a plurality of display intervals of the item of content, according to one implementation.

FIG. 1D is a cumulative graph of positive interactions 140-146 with an item of content by a plurality of users at a plurality of display times of the item of content 130-136, according to one implementation. Intervals between the display times 130-136 may not be identical in length, as shown. In some implementations, intervals may be measured from a time at which streaming of the application is started, a time at which the application is launched, a time at which a user is able to utilize the streamed application (e.g. after a splash screen, or creation or opening of a file, etc.), a time at which the user selects to stream the application, or any other such time; and may end at a time at which the item of content or offer message is displayed. These times may be referred to as an initial interval. Intervals may also be measured between consecutive or subsequent displays of the offer or item of content, such as from a time at which the user selects to continue previewing the application or dismiss the offer to a subsequent time at which the offer is re-displayed; or from a time at which the offer is displayed to the next time at which the offer is displayed. Such times may be referred to as subsequent intervals; second, third, fourth, etc. intervals; or any other such term. In other implementations, other definitions for intervals may be used (e.g. an interval starting at a time at which the offer is retrieved from a storage medium for display; a time at which the offer is transmitted, to take into account network latency; etc.). In the implementation illustrated, a first portion of users 140 respond positively to the first display of the item of content at time 130. At a subsequent second display of the item of content at time 132, a second portion of users 142 respond positively. At a third display of the item of content at time 134, a third portion of users 144 respond positively. At a fourth display of the item of content at time 136, a fourth portion of users 146 respond positively. Additional instances of display of the item of content may be provided until the cumulative number of positive responses is equal to 100% of the number of users of the corresponding application or viewers of the streamed media, or any remaining users have ceased using or viewing the content, as discussed above.

As shown, a predetermined threshold 148 may be set. This threshold may be referred to as a target acceptance ratio or target acceptance threshold, target installation rate, target purchase rate, or by other such names. The threshold 148 may be set by an administrator, content provider, advertiser, or other such entity. The threshold 148 may be set to a desired ratio of positive responses for a first display of an offer or item of content, such as 30%, 50%, 70% or any other such value. Lower ratios may result in a shorter delay before display of the second item of content, while higher ratios may result in a longer delay before display of the second item of content.

As shown in FIG. 1D, in some implementations, the cumulative number of positive responses may be less than threshold 148 at a first display time 130. In the implementation shown, the cumulative number of positive responses (e.g. amount 140 plus 142) at display time 132 may also be below the threshold 148. The cumulative number of positive responses may exceed the threshold at a subsequent time, such as third display time 134 as shown. Accordingly, in the implementation shown, the first (and second) displays of the second item of content result in a ratio of positive responses less than threshold 148, indicating that at these display times, an insufficient number of users have decided to respond positively. Thus, the initial or first display time 130 may be delayed for a period (e.g. subsequent to time 132), such that after adjustment, the ratio of positive responses to the display at the new first display time is equal to the threshold 148.

Figure 1E:
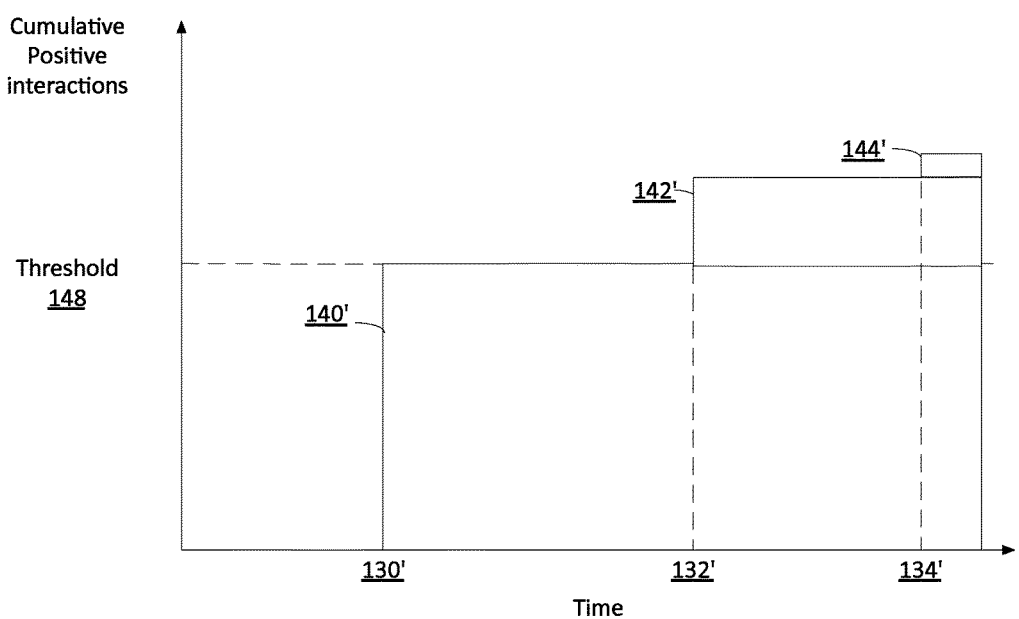
FIG. 1E is a graph of positive interactions with the item of content by a plurality of users at a plurality of adjusted display intervals of the item of content, according to one implementation.

FIG. 1E is a graph of cumulative positive interactions with the item of content by a plurality of users at a plurality of adjusted display intervals of the item of content, as discussed above. As shown, the first time of display 130' has been delayed compared to the implementation of FIG. 1D, and as a result, more users have decided to respond positively to the display of the item of content, resulting in a positive acceptance ratio equal to threshold 148. Remaining undecided users respond positively at delayed times 132' and 134' as shown.

In the implementation illustrated in FIG. 1E, the first display time 130' has been adjusted such that the rate of positive acceptances 140' is equal to the threshold 148. In practice, this level of accuracy may not be achieved on a first adjustment of the initial display time. Instead, the initial display time may be automatically delayed or advanced over multiple adjustment iterations based on the previously used display times 130-136. In one such implementation, after obtaining the results as shown in FIG. 1D, the system may adjust the initial display time 130' to equal time 134, as this is the first point at which the rate exceeds the threshold 148. Subsequently, if the ratio of positive interactions at this new adjusted first display time is equal to value 144 (e.g. the total of users who would have responded at times 130, 132, and 134), the ratio will exceed threshold 148. In a second adjustment iteration, the first display time may be advanced by a portion, such as between times 132 and 134, or 130' as shown. Over multiple iterations of adjustment, the initial display time will thus be adjusted such that the ratio of responses is equal to threshold 148. Furthermore, as the system may continue monitoring the ratio of positive responses, if user behavior changes (e.g. due to sales, increased interest in the content, holiday shopping seasons, etc.), the system may dynamically adjust the first display interval as necessary to ensure an optimum or desired positive response rate.

Figure 1F:
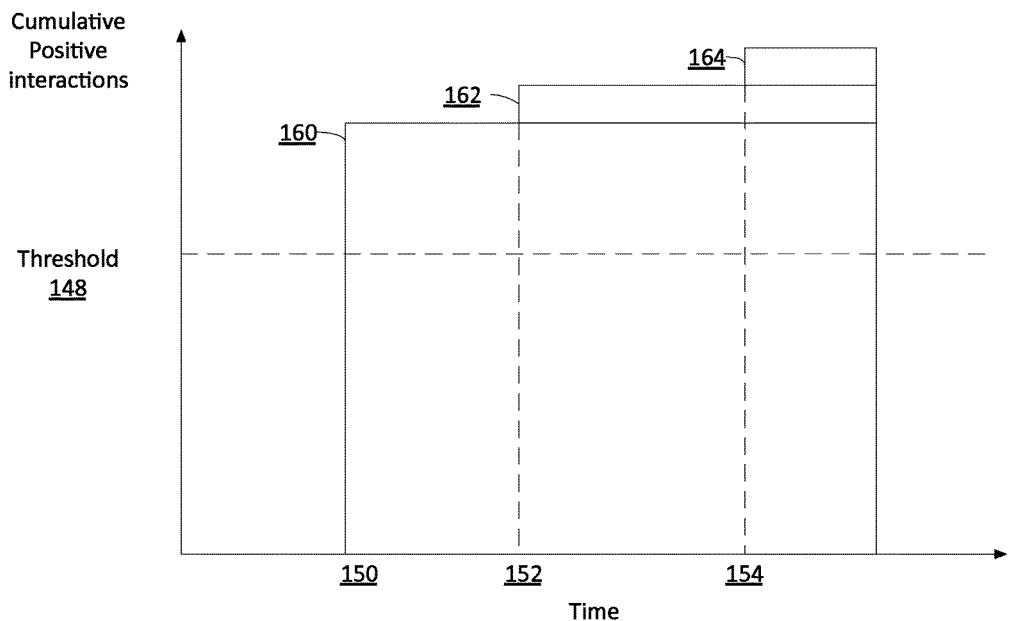
FIG. 1F is another graph of positive interactions with an item of content by a plurality of users at a plurality of display intervals of the item of content, according to one implementation.
Figure 1G:
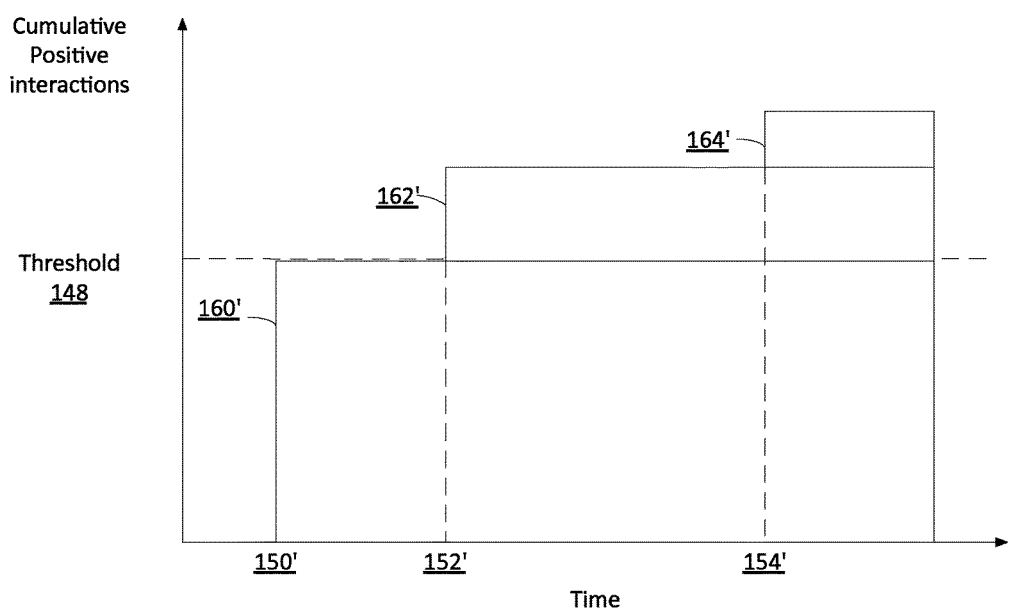
FIG. 1G is another graph of positive interactions with the item of content by a plurality of users at a plurality of adjusted display intervals of the item of content, according to one implementation.

FIGS. 1F and 1G illustrate similar graphs to FIGS. 1D and 1E, respectively. However, in the graph illustrated in FIG. 1F, the ratio of positive interactions 160 at the first display time 150 exceeds threshold 148. This is similar to the second iteration of adjustment discussed above. Some of these positive-responding users likely would have responded positively if the item of content or offer were shown at an earlier time. Accordingly, as with FIG. 1G, in FIG. 1F, the initial display time 150' has been advanced such that fewer users respond positively, with ratio 160' equal to threshold 148. As discussed above, this adjusted display time 150' may be obtained after one or more adjustment iterations.

Figure 1H:
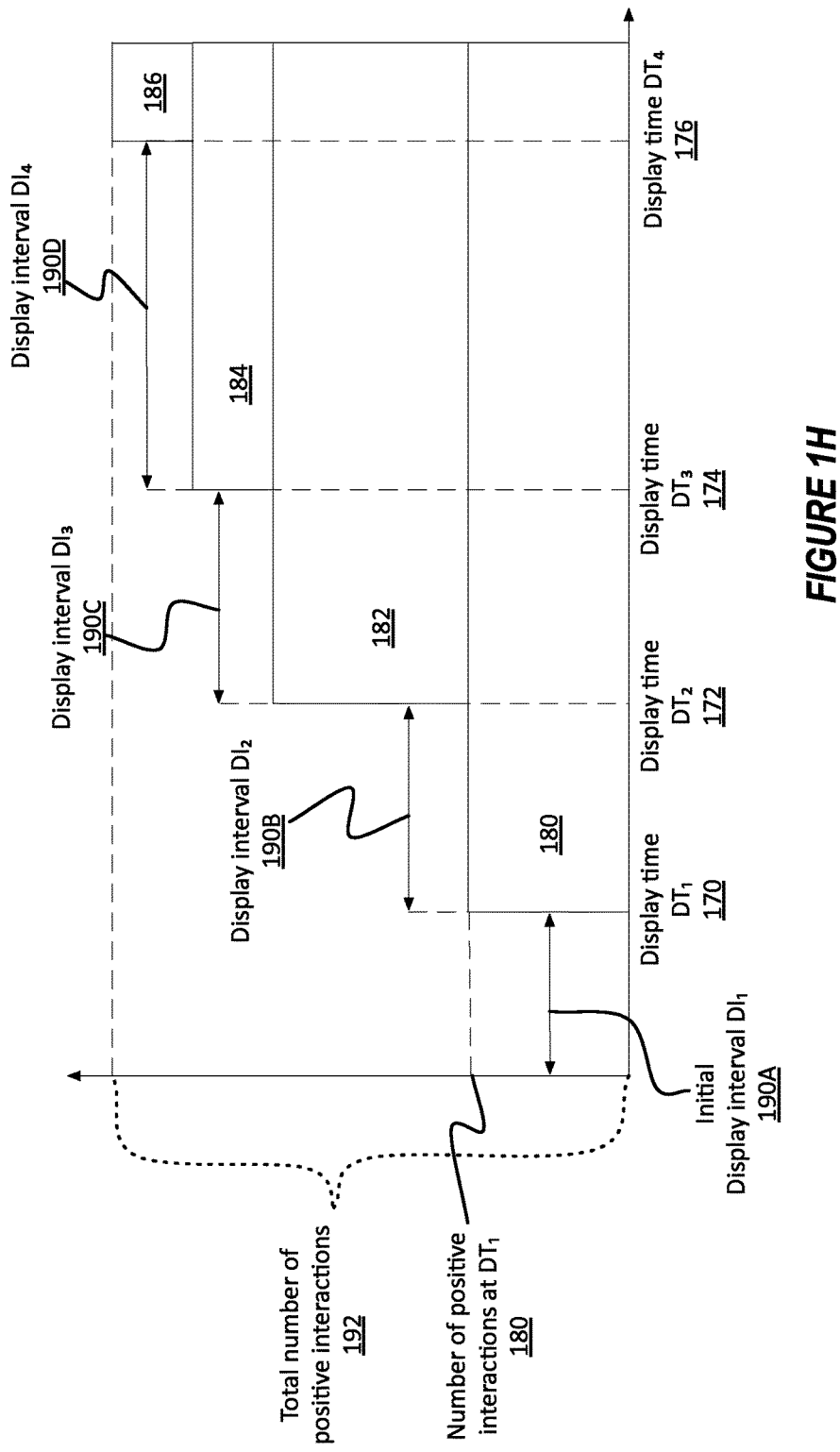
FIG. 1H is another graph of positive interactions with an item of content by a plurality of users at a plurality of display intervals of the item of content.

To illustrate how the initial display time is adjusted in some implementations, FIG. 1H is another graph of positive interactions with an item of content by a plurality of users at a plurality of display intervals of the item of content. As shown, at a first display time $DT_1$ 170, a first number of users 180 accept or respond positively. This value may be recorded in a database or index identifying the number of accepting users, the display time and/or the initial display interval 190A (which is equal to the display time $DT_1$), and in some implementations, an index or display number (e.g. 1). At a subsequent second display time $DT_2$ 172, a second number of users 182 accept or respond positively. This may also be recorded in a database at a second index or display number (e.g. 2). Similarly, a third number of accepting users 184 may be recorded at an index (e.g. 3) for a third display time $DT_3$; a fourth number of accepting users 186 may be recorded at an index (e.g. 4) for a third display time $DT_4$; and so on until either no additional users accept or respond positively, a predetermined maximum display time or interval is reached, a predetermined index value is reached, a total number of positive interactions 192 (e.g. the sum of values 180-186) exceeds a predetermined percentage of the number of users to whom the first item of content is streamed or delivered, etc.

Accordingly, in one implementation, an index may comprise:

| Index entry number | Display Interval | Display Time | Number of positive interactions |
|---|---|---|---|
| 1 | $DI_1$ | $DT_1$ | Number of positive interactions at $DT_1$ |
| 2 | $DI_2$ | $DT_2$ | Number of positive interactions at $DT_2$ |
| 3 | $DI_3$ | $DT_3$ | Number of positive interactions at $DT_3$ |
| n | $DI_n$ | $DT_n$ | Number of positive interactions at $DT_n$ |

In some implementations, the index may include a ratio of cumulative positive interactions to the total of positive interactions at each entry, although again, this may be readily determined: for any index m, the ratio of positive interactions is (the sum of the number of positive interactions at each of $DT_1$ through $DT_m$) divided by the sum of the number of positive interactions at each of $DT_1$ through $DT_n$, or the total number of positive interactions.

In some implementations, the index may not include either a display interval or a display time, as each can be readily determined from the other: for any index m, $DT_m$ is equal to the sum of $DI_1$ though $DI_m$; and conversely, for any $DI_m$ is equal to $DT_m$ minus $DT_{m-1}$. In a further implementation, the display interval at any index after the initial display interval may be determined based on a back-off rate set to a predetermined value, typically greater than or equal to 1, although potentially smaller than 1 in some implementations. The back off rate may be used to reduce the frequency of display of the item of content to reduce user frustration, particularly among the users who take the longest to determine whether to accept the offer. The display interval at any index m>1 may equal the previous display interval $DI_{m-1}$ multiplied by the back off rate. If an initial display interval is set to 15 seconds, then $DI_2$ equals 30 seconds; $DI_3$ equals 1 minute, etc. To prevent the interval from growing too large, in some implementations, a predetermined upper limit or maximum interval may be set (e.g. 5 minutes), such that any display interval that would be calculated to exceed the maximum interval is instead reset to said maximum interval.

As discussed above, the ratio of the cumulative number of positive responses at any display time to the total number of positive responses may be compared to a target positive response threshold, and the initial display interval adjusted accordingly. When positive response data for enough users is collected, the content server may dynamically calculate new display intervals. In an illustrative implementation, a target response ratio threshold for the first display time may be specified as 50%, and the content server may have received 70 positive responses, with 50 positive responses received at a first display time of 15 seconds, 15 responses at a second display time of 45 seconds, and 5 responses at a third display time of 105 seconds. This represents an initial display time of 15 seconds and a back off rate of 2. As the number of positive responses at the first display time exceeds the target response ratio threshold of 50% or 35 responses out of the 70 response total, the server may identify that the first quantile or set of responses exceeds the threshold and the corresponding first display interval time should be reduced. In other instances, if the cumulative number of positive responses did not exceed the threshold until the second or later quantile or set of responses, the first display interval time would be extended.

As discussed above, a new first interval is calculated by adding the time of the previous interval to the identified quantile at which the cumulative response ratio exceeds the threshold (e.g. the first quantile in the given instance above, so the previous interval equals 0) to the delay interval for the specified quantile multiplied by the target threshold ratio (e.g. 50%) multiplied by the total number of positive responses (e.g. 70), divided by the cumulative number of positive responses at the identified quantile (e.g. 50). In summary, given an identified quantile x at which the ratio of cumulative total of responses exceeds the target threshold ratio, the adjusted first interval is calculated as:

$$\text{New first interval} = DT_{x-1} + DI_x * ([0045]/50) = 15 * (35/50) = 10.5 \text{ seconds.}$$

Given a back off rate of 2, $DI_2$ is therefore (10.5*2) or 21 seconds; and $DI_3$ is (21*2) or 42 seconds. In many implementations, as discussed above, display intervals may be bounded by a predetermined maximum value. Similarly, the intervals may be bounded by a predetermined minimum value (particularly where the backoff rate may be less than 1). Accordingly, the $DI_x$ for any quantile x may be defined as:

$$DI_x = \text{Min}[0046]$$

Figure 2A:
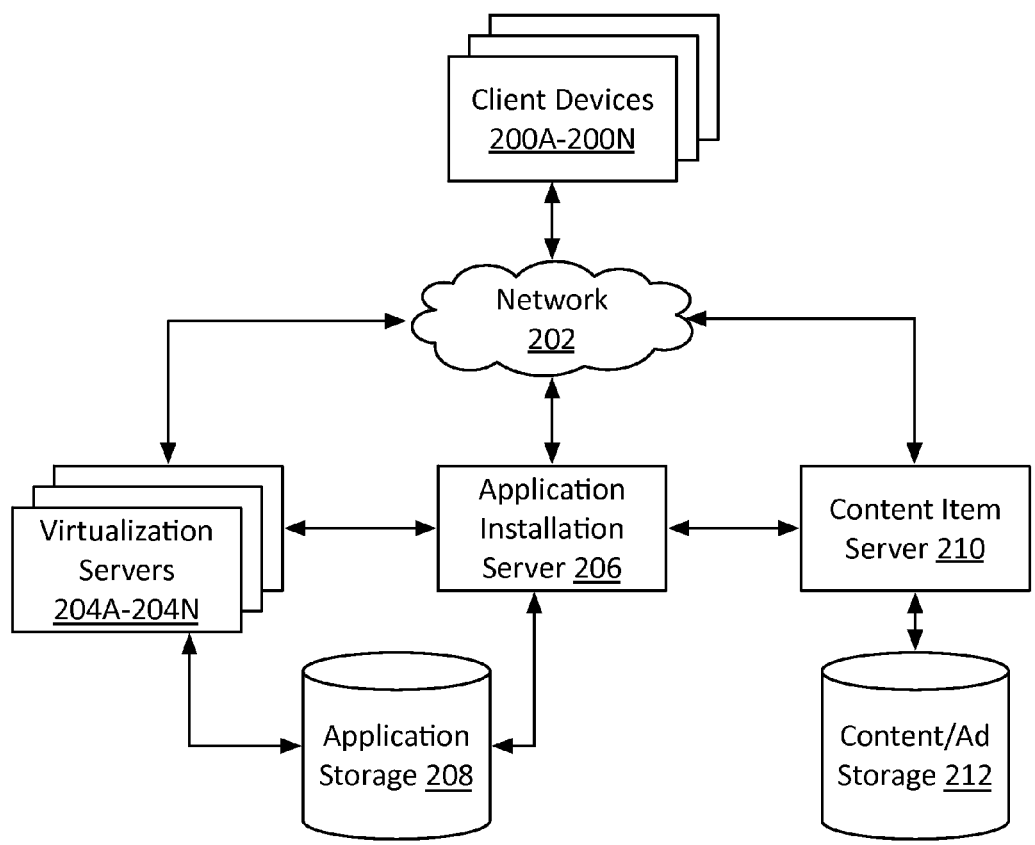
FIG. 2A is a block diagram of system for dynamic content display time adjustment, according to one implementation.

FIG. 2A is a block diagram of system for dynamic content display time adjustment, according to one implementation. As shown, a plurality of client devices 200A-200N may communicate via a network 202 with one or more virtualization servers 204A-204N, an application installation server 206, and/or a content item server 210, in some implementations. In other implementations in which application virtualization is not used, such as with locally installed applications or streamed media, the virtualization servers 204 may not be included.

Client devices 200A-200N, referred to generally as client devices, local devices, or user devices 200, may be laptop computers, desktop computers, tablet computers, smart phones, set top boxes, smart televisions, wearable computers, or any other type and form of computing device. Client devices 200 discussed in more detail below in connection with FIG. 2B may receive and display a first item of content, such as a streamed application, streamed media, downloaded and locally executed application, or any other such content; as well as an interactive second item of content, such as an offer or advertisement for content related to the first item of content, as discussed above.

Network 202 may include any type and form of network, including a wide area network (WAN) such as the internet, a local area network (LAN), a wireless network, a cellular network, an ad hoc network, a mesh network, a pseudo or asynchronous network with exchange of physical storage devices such as a "sneakernet", or any other type and form of network for providing communications between client devices and one or more servers. In some implementations, network 202 may include a combination of several networks and may include one or more intermediary devices (not illustrated) such as gateways, routers, firewalls, switches, or other such devices.

Virtualization servers 204A-204N, referred to generally as virtualization servers 204, may comprise one or more physical computing devices, and/or one or more virtual computing devices executed by one or more physical computing devices. In some implementations, virtualization servers 204 may execute an application in a sandbox or virtual environment on behalf of a client device, and may provide visual and audio feedback of the application via a presentation layer protocol such as a remote desktop protocol to a client device, and receive interactions with the application (e.g. selection, text entry, etc.) via the protocol from the client device.

Application installation server 206 may be one or more physical computing devices or virtual computing devices executed by one or more physical computing devices for delivery of applications to client devices for local installation. Application installation server 206 may be an online application store allowing purchase and/or download and installation of applications. In some implementations, application installation server 206 may provide an interface for requesting preview of an application by a client device, the application installed on a virtualization server 204 and connected to the client device as discussed above. Application installation server 206 may maintain or communicate with application storage 208, which may include one or more storage devices for storing applications, installation packages, or other such content.

A content item server 210 may be one or more physical computing devices or virtual computing devices executed by one or more physical computing devices for transmitting content items to a client device, such as an interactive offer or advertisement as discussed above. Content items may be stored in one or more storage devices 212 in some implementations. In other implementations, interactive items of content such as offers or advertisements may be delivered to the client with a locally-executed application, or may be generated by the application during executing in a trial or demonstration mode, as discussed above. In such implementations, content item server 210 may not be included.

Figure 2B:
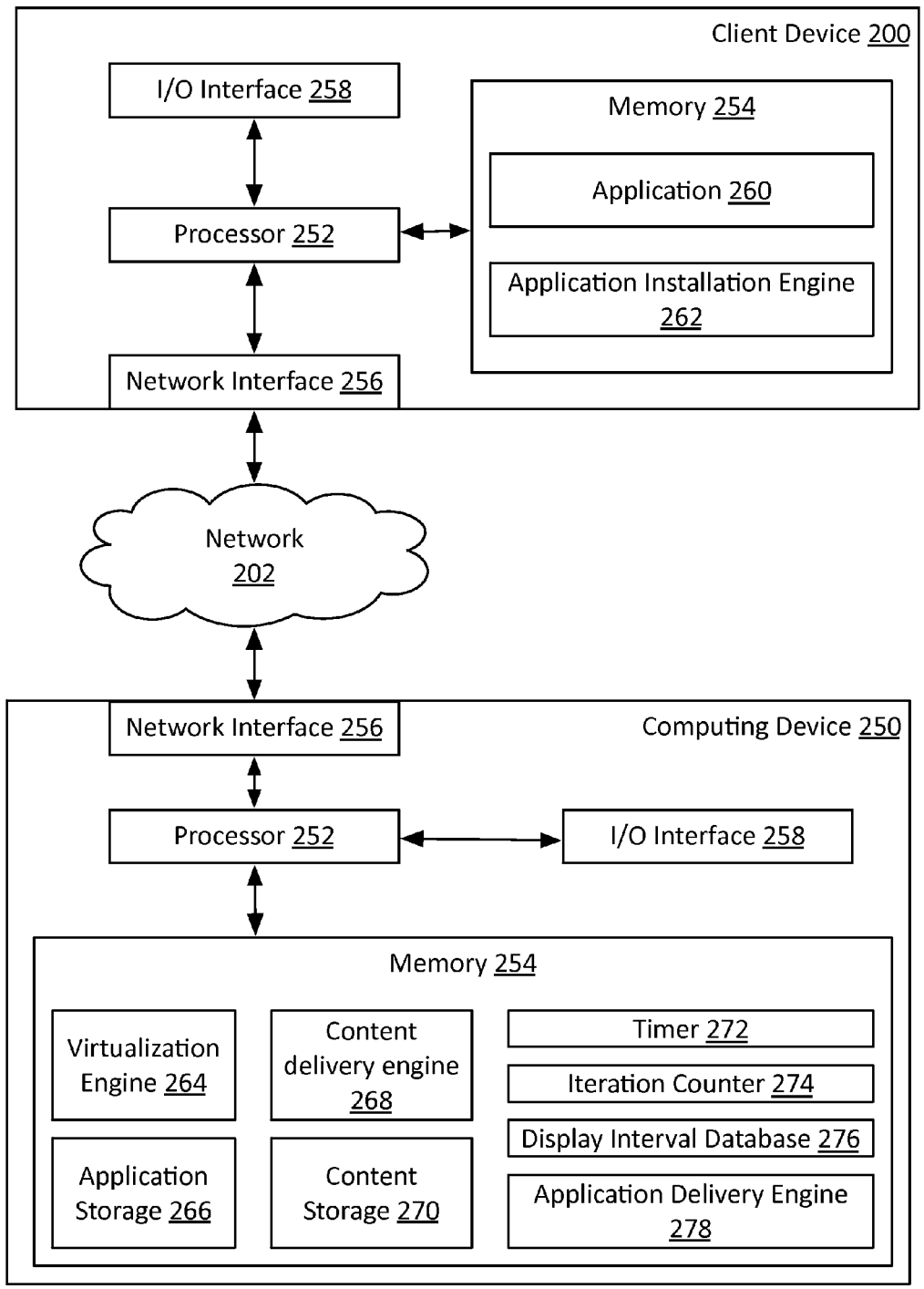
FIG. 2B is a block diagram of computing devices of the system of FIG. 2A, according to one implementation.

FIG. 2B is a block diagram of computing devices of the system of FIG. 2A, according to one implementation. As discussed above, client device 200 may be any number of different types of user electronic devices configured to communicate via network 202, including without limitation, a laptop computer, a desktop computer, a tablet computer, a smart phone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access network 202 via a local area network, or another category of electronic devices such as a wearable device.

In many implementations, client device 200 includes a processor 252 and a memory 254. Memory 254 may store machine instructions that, when executed by processor 252 cause processor 252 to perform one or more of the operations described herein. Processor 252 may include a microprocessor, ASIC, FPGA, etc., or combinations thereof. In many implementations, processor 252 may be a multi-core processor or an array of processors. Memory 254 may include, but is not limited to, electronic, optical, magnetic, or any other storage devices capable of providing processor 252 with program instructions. Memory 254 may include a floppy disk, CD-ROM, DVD, magnetic disk, memory chip, ROM, RAM, EEPROM, EPROM, flash memory, optical media, or any other suitable memory from which processor 252 can read instructions. The instructions may include code from any suitable computer programming language such as, but not limited to, C, C++, C#, JAVA, JAVASCRIPT, PERL, HTML, XML, PYTHON, VISUAL BASIC, et cetera.

Client device 200 may include one or more network interfaces 256. A network interface 256 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; BLUETOOTH or other short range wireless connections; or any combination of these or other interfaces for communicating with a network 126. In many implementations, client device 200 may include a plurality of network interfaces 256 of different types, allowing for connections to a variety of networks 202 or a network 202 such as the Internet via different sub-networks.

Client device 200 may include one or more user interface devices 258. A user interface device 258 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 254 an application 260 or may execute an application 260 with a processor 252. Application 260 may be any type and form of application, applet, script, service, daemon, routine, or other executable logic. In one implementation, application 260 may be a web browser, while in another implementation, application 260 may be a video game. Application 260 may include functionality for displaying content received via network interface 256 and/or generated locally by processor 252, and for transmitting interactions received via a user interface device 258, such as requests for websites, selections of survey response options, input text strings, etc. In other implementations, application 260 may be a virtualization client application for communicating via a presentation layer protocol with a virtualization server 204 and/or virtualization engine 264 discussed below.

Client device 200 may also include an application installation engine 262. Application installation engine 262 may be an application, server, daemon, routine, or other executable logic for downloading and/or installing an application from a provider. In some implementations, application installation engine 262 may be an interface to an online application store. Application installation engine 262 may include an interface for selecting to download or purchase an application, or to preview the application via a virtualization server, as discussed above.

Computing device 250 may be a virtualization server 204, an application server 206, and/or a content server 210, referred to generally as a server 250, as discussed above in connection with FIG. 2A. As with client devices 200, server 250 may include one or more processors 252, memories 254, network interfaces 256, and user interfaces 258. In some implementations referred to as headless servers, a server 250 may not include a user interface 258, but may communicate with clients 200 with user interfaces 258 via a network 202.

Server 250 may include a virtualization engine 264. Virtualization engine 264 may include an application, server, daemon, routine, or other executable logic for executing an application in a virtual or sandbox environment on behalf of a client device 200, and for communicating with the client device via a presentation layer protocol as discussed above. Virtualization engine 264 may instantiate a virtual environment responsive to a request by the client device to preview an application stored in application storage 266. The virtualization engine 264 may install the application into the virtual environment, and present the application to the client device. The virtualization engine 264 may also periodically present offers or advertisements or reminders to download and install the application locally, as discussed herein.

Application storage 266 may include one or more applications or application installation packages. Applications may be delivered to a client device 200 for installation by an application installation engine 262 and local execution, and/or may be provided to a virtualization engine 264 or virtual environment provided by a virtualization engine 264 on the server 250 or another server 250 for execution and display to the client device 200.

Memory 254 may also include a content delivery engine 268. Content delivery engine 268 may include an application, server, daemon, routine, or other executable logic for periodically presenting an interactive second item of content to allow a user to accept, purchase, or download a first item of content (e.g. an application being previewed, a stream of media, etc.) and for dynamically determining display time intervals. In some implementations, generation or presentation of the content may be performed by an application or virtualization engine 264 in communication with a content delivery engine 268 of a server 250. Content delivery engine 268 may receive identifications of acceptance or positive responses from each application or client device 200, and/or from an application delivery engine 278 or virtualization engine 264, along with identifications of a display interval, display time, or iteration of display of the content. Data may be anonymized or not include personal identifiers or identifiers of the client device 200 in many implementations. As discussed above, content delivery engine 268 may aggregate data until a predetermined amount of data has been received, and then may recalculate initial display interval times and/or other display intervals or presentation times. In some implementations, such as where the interactive content includes graphics, audio, or video, content storage 270 may store corresponding data for delivery to the client device and/or virtualization engine 264. In some implementations, memory 254 may maintain an iteration counter 274 for maintaining an index position when comparing cumulative quantile results to a response ratio threshold. Memory 254 may also maintain a display interval database 276 or index of display intervals and/or display times, as well as numbers of positive responses corresponding to each display received from client devices and/or virtualization engines or applications. Memory 254 may also include a timer 272 for counting up to display times or counting down display intervals. In many implementations, timer 272 may be executed by an application on a client, or by an application in a virtual environment.

As discussed above, memory 254 may also include an application delivery engine 278 for delivering applications to a virtual environment and/or an application installation engine 262 executed by a client device 200. Application delivery engine 278 may be a server maintaining an online application store, accessible by an application installation engine 262. The application delivery engine 278 may be configured to, responsive to a request from a client device to preview a selected application, instruct the virtualization engine 264 to instantiate a virtual environment and install the application for display to the client device.

Memory 254 may also include additional storage such as storage of applications, advertisements or offers, web pages, images, audio files, video files, data files, or any other type and form of data. In some implementations, memory 254 may store one or more applications for execution by processor 252 of the server 250, including FTP servers, web servers, mail servers, file sharing servers, peer to peer servers, or other such applications for delivering content stored in content storage.

Figure 3:
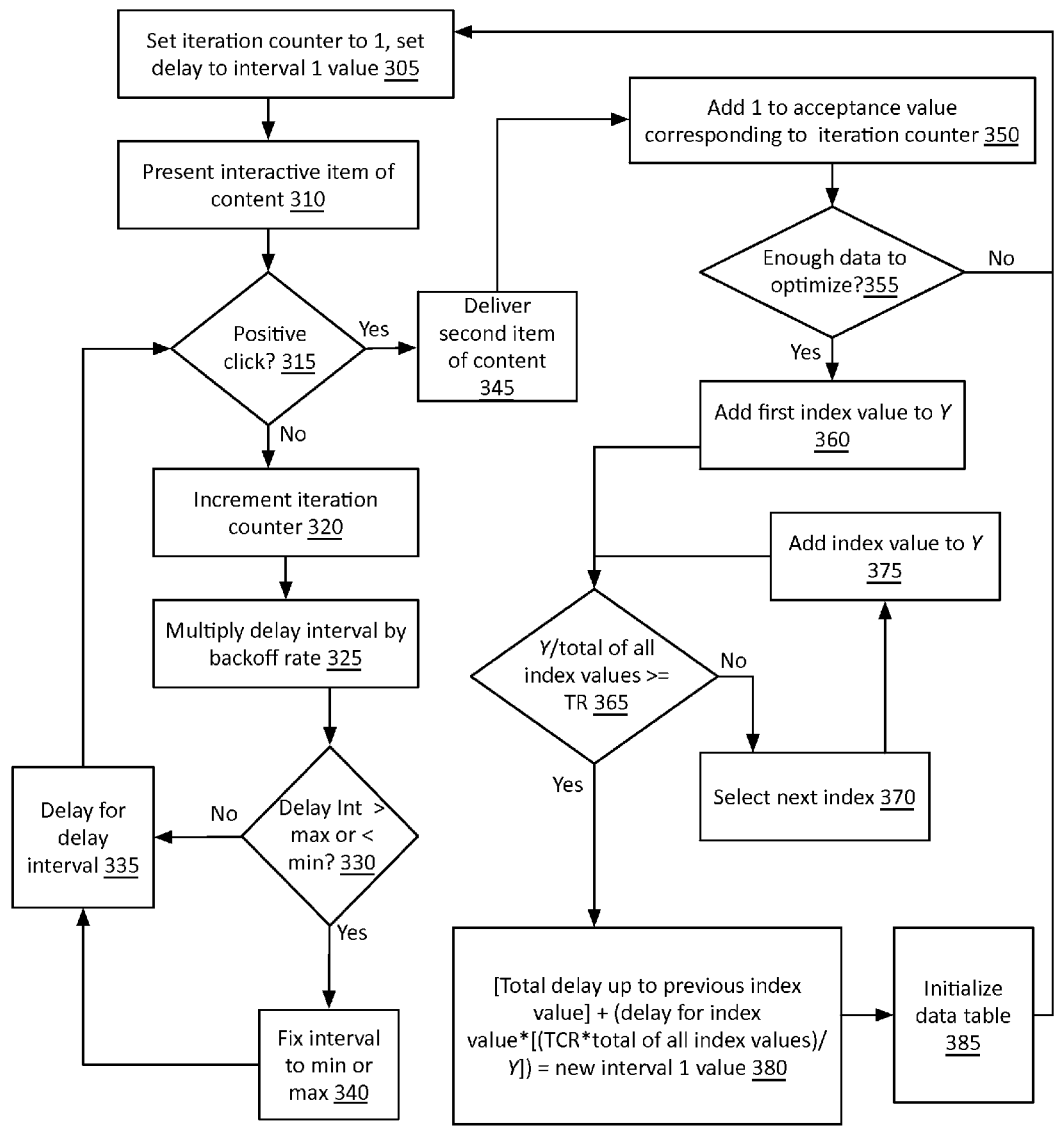
FIG. 3 is a flow diagram of an implementation of a method for dynamic content display time adjustment.

FIG. 3 is a flow diagram of an implementation of a method for dynamic content display time adjustment. As discussed above, in some implementations, the method may be executed by an application executing on a client computing device, while in other implementations, the method may be executed by an application executed by a virtualization server on behalf of a client device, by an content delivery server, or any other such device. In some implementations, a first portion of the method may be performed by an application executing on the client device or an application in a virtual environment, such as steps 305-335, while a second portion may be performed by a content delivery server or application delivery server, such as steps 345-385.

At step 305, in some implementations, an iteration counter or quantile counter may be set to a starting or initial value, such as 1. A delay timer or countdown timer may be set to a first delay interval $DI_1$ or first delay time $DT_1$ value previously assigned by a content delivery server or administrator.

At step 310, an interactive item of content, such as an offer or advertisement to purchase, download, or unlock the application executing on the client and/or in the virtualization environment, or purchase media or another item of content related to a streamed item of content, may be displayed by the client device. Display of the item of content may include receiving the item of content from a content server by the client device, receiving the item of content from the content server by a virtualization server, transmitting a request for an item of content by either the virtualization server or the client device and receiving a response comprising the item of content from the content server, generating the item of content locally by the application or by an application installation engine of the client device, or any other such means. As discussed above, the item of content may be a pop-up or overlay window, a banner, a dialog box, or any other such interface element. The item of content may include a button or element for providing a positive response or acceptance. The item of content may also include a second button or element to dismiss or postpone the offer or advertisement for a delay interval. In some implementations, the offer or advertisement may be dismissed and delayed responsive to expiration of a display timer. The item of content may also include a third button or element to exit the application or stop receiving a media stream, in some implementations, exiting the method of FIG. 3.

At step 315, the client device and/or content delivery server or virtualization server may determine whether the user has accepted or responded positively to the item of content. In some implementations, the device or server may determine that the user has accepted or responded positively responsive to a selection of an interface element, or otherwise indicated acceptance (e.g. via a spoken acknowledgement received by a microphone, gesture on a touchpad or received via another device, entered password or text string, etc.). Conversely, the device or server may determine that the user has not accepted or responded positively responsive to expiration of a display timer, or selection of a postponement or dismissal option or element as discussed above.

If the user has not responded positively or selected to postpone or dismiss the offer, then the item of content may be dismissed, allowing the user to return to usage of the previewed application or media stream or other content. At step 320, the device or server may increment the iteration counter 320 for display of the item of content. This allows the device or server to keep track of a quantile or presentation of the content in which the user finally accepts the offer.

At step 325, in some implementations, the device or server may multiply the delay interval by a backoff rate as discussed above. The backoff rate may be assigned by an administrator or content provider, and may frequently be greater than or equal to 1, although values less than one are possible. At step 330, the device or server may compare the result of the multiplication to a preset maximum delay interval and/or a preset minimum delay interval. If the result is within the bounds of the minimum and/or maximum, then the result may be set as the new delay interval at step 335 for the next delay time. A timer may be set to the interval and activated, or a presentation time may be calculated. Conversely, at step 340, if the result of the multiplication is greater than the allowed maximum or less than the allowed minimum, then the result may be adjusted to equal the corresponding maximum or minimum interval. Once fixed to the corresponding maximum or minimum interval, the value may be set as the new delay interval at step 335 as discussed above.

In some implementations, steps 325-340 may be performed by the client device, virtualization server, or content delivery server during each iteration as shown in the flow chart. In other implementations, delay intervals and/or delay times may be calculated in advance. Once the initial delay interval is set or determined, and the back off rate and any minimum or maximum bounds are set, each further interval may be calculated ahead of time. Accordingly, in such implementations, steps 325-340 may be replaced by a single step of retrieving the next delay interval or presentation time from a data table and setting the timer accordingly.

Steps 315-340 may be repeated iteratively until the user responds positively to the item of content at step 315. An identification of the positive response, as well as the iteration counter value (indicating at which iteration the user responded positively) may be transmitted to the content delivery server for use in dynamically recalculating the initial interval time. At step 345 in some implementations, responsive to the positive response, a second item of content may be delivered to the client device, such as the requested application for local installation, an unlock code or token, an album, television show, movie, or other such related content as discussed above.

At step 350, responsive to receiving the identification of the positive response and the iteration counter, the content delivery server may increment a counter or value in a data table for the number of positive responses corresponding to the iteration counter or quantile. This counter may be incremented for each positive response with the same iteration counter value, and may represent the total positive responses received for the corresponding iteration of display of the offer.

At step 355, in some implementations, the content delivery server may determine whether enough positive responses have been received such that the initial interval may be optimized. Optimizing based on a small number of responses may result in drastic swings in the value of the initial interval, while optimizing based on a large number of responses may result in many users experiencing incorrect and frustrating delay interval timings. Accordingly, a number of responses may be required before performing steps 360-385, such as 100 responses, 500 responses, 1000 responses, or any other such value. In another implementation, steps 360-385 may be performed periodically regardless of the number of responses, such as once per hour, once per day, once per week, or any other such value.

If there is not enough data to be optimized, then the method may be repeated until sufficient data has been received or the predetermined time period has expired, before proceeding to step 360. At step 360, the content delivery server may retrieve the value identifying the number of positive responses at the first display interval or first iteration counter value, storing this value as y. The content delivery server may also calculate a sum of the values identifying the number of positive responses for all display intervals, or a total number of positive responses. At step 365, content delivery server may determine wither y divided by the total number of positive responses is greater than or equal to the target ratio. If so, then the interval timing may need to be reduced. If not, then the interval timing may need to be expanded.

If x divided by the total number of positive responses is not greater than or equal to the target ratio, then at step 370, the content delivery server may select a next iteration or index in the data table, and retrieve the corresponding value identifying the number of positive responses for the iteration or quantile. At step 375, this retrieved value may be added to y, such that y is equal to the cumulative number of positive responses received at the corresponding delay interval.

Steps 365-375 may be repeated iteratively until identifying an iteration or quantile display interval with a cumulative number of positive responses that, divided by the total number of positive responses, is greater than or equal to the target ratio.

At step 380, the new initial delay interval may be calculated, as discussed above, with $DT_{x-1}$ equal to the display time of the previous quantile or the sum of all delay intervals up to the previous quantile's display time; $DI_x$ equal to the delay interval for the selected quantile x; and y equal to the cumulative number of positive responses received at and up to quantile x:

$$\text{New first interval} = DT_{x-1} + DI_x * ([0079]/y)$$

Accordingly, the new interval is expanded or reduced responsive to the ratio of y to the total being below or above the target ratio.

Once the new initial delay interval is calculated, other delay intervals may be calculated as discussed above at steps 325-340. At step 385, the data table identifying the number of positive responses received at each quantile may be reset, so that new data may be collected. The new delay intervals may be provided to the client devices or virtualization server as discussed above, and the method may repeat. Over multiple iterations, the first interval will be automatically adjusted to approach an optimized value such that the ratio of positive responses received at the first display time or quantile is equal to the target threshold ratio, as discussed above.

Accordingly, the systems and methods discussed herein provide automatic and dynamic iterative adjustment and optimization of delay intervals before display of an offer, advertisement, "offer screen", or other such content. These methods and systems may also be employed in any implementation in which an item of content or other entity is displayed to a user for acceptance, or may be dismissed for a period of time, including product registration or warranty dialogs, software update or upgrade dialogs, notifications of new blog content, or any other such interactive acceptable/postponable dialogs.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform run-time environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a readonly memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smart phone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for determining initial intervals for displaying prompts to download streaming applications, comprising:
   streaming, to each of a plurality of computing devices, by a content delivery provider executed by a first computing device, an application executed by the first computing device on behalf of each of the plurality of computing devices;
   transmitting, by the content delivery provider, a content item including a prompt for downloading the application to each of the plurality of computing devices after a first initial display interval comprising a predetermined time between beginning streaming of the application and display of the prompt of the content item;
   receiving, by the content delivery provider, a first number of positive user interactions with the prompt of the content item after the first initial display interval and a total number of positive user interactions with the prompt of the content item;
   determining, by the content delivery provider, that a ratio of the first number of positive user interactions to the total number of positive user interactions exceeds a threshold ratio;
   reducing, by the content delivery provider, the first initial display interval to generate a second initial display interval by multiplying the first initial display interval with a ratio of a target first-display quantile divided by the first number of positive user interactions with the prompt of the content item after the first initial display interval, the second initial display interval less than the first initial display interval based on determining that the ratio of the first number of positive user interactions to the total number of positive user interactions exceeds the threshold ratio;
   streaming, by the content delivery provider, the application executed by the first computing device to a second computing device; and
   transmitting, by the content delivery provider, the content item including the prompt for downloading the application to the second computing device after the second initial display interval, a positive interaction on the prompt at the second computing device directing the content delivery provider to cease streaming of the application to the second computing device after the second initial display interval thereby reducing consumption of resources by the content delivery provider.

2. The method of claim 1, wherein transmitting the content item including the prompt to each of the plurality of computing devices further comprises:
   retransmitting the content item including the prompt to a subset of the plurality of computing devices after a second display interval comprising a first predetermined time between transmitting the content item including the prompt and retransmitting the content item including the prompt, by the content delivery provider, responsive to not receiving a positive user interaction with the prompt of the content item after the first initial display interval.

3. The method of claim 1, further comprising:
   determining, by the content delivery provider, that the received first number of positive user interactions with the prompt of the content item after the first initial display interval divided by the total number of positive user interactions with the prompt of the content item is less than a predetermined first-display interaction ratio; and
   wherein calculating the second initial display interval is performed responsive to the determination that the received first number of positive user interactions with the prompt of the content item after the first initial display interval divided by the total number of positive user interactions with the prompt of the content item is less than the predetermined first-display interaction ratio.

4. The method of claim 1, wherein the target first-display quantile comprises a predetermined first-display interaction ratio multiplied by the total number of positive user interactions with the prompt of the content item.

5. The method of claim 1, further comprising determining, by the content delivery provider, that the total number of positive user interactions with the prompt of the content item is greater than an optimization data threshold.

6. The method of claim 1, further comprising determining, by the content delivery provider, that the second initial display interval does not exceed an upper or lower boundary; and wherein transmitting the content item including the prompt to the second computing device, after the second initial display interval, is performed responsive to the determination that the second initial display interval does not exceed the upper or lower boundary.

7. A system for determining initial intervals for displaying prompts to download streaming applications, comprising:
   a first computing device in communication with a plurality of computing devices via a network interface of the first computing device, the first computing device executing a virtualization engine and a content delivery server;

wherein the virtualization engine is configured to:
stream, to each of the plurality of computing devices, an application executed by the virtualization engine on behalf of each of the plurality of computing devices, and
transmit a content item including a prompt for downloading the application to each of the plurality of computing devices after a first initial display interval comprising a predetermined time between beginning streaming of the application and display of the prompt of the content item; and wherein the content delivery server is configured to:
receive a first number of positive user interactions with the prompt of the content item after the first initial display interval and a total number of positive user interactions with the prompt of the content item,
determine that a ratio of the first number of positive user interactions to the total number of positive user interactions exceeds a threshold ratio, and
reduce the first initial display interval to generate a second initial display interval by multiplying the first initial display interval with a ratio of a target threshold first-display quantile divided by the first number of positive user interactions after the first initial display interval, the second initial display interval calculated to be less than the first initial display interval based on determining that the ratio of the first number of positive user interactions to the total number of positive user interactions exceeds the threshold ratio; and wherein the virtualization engine is further configured to:
stream the application executed by the virtualization engine to a second computing device, and
transmit the content item including the prompt to download the application to the second computing device after the second initial display interval, a positive interaction on the prompt at the second computing device directing the content delivery server to cease streaming of the application to the second computing device after the second initial display interval thereby reducing consumption of resources by the content delivery server.

8. The system of claim 7, wherein the virtualization engine is further configured to:
retransmit the content item including the prompt to a subset of the plurality of computing devices after a second display interval comprising a second predetermined time between transmitting the content item including the prompt and retransmitting the content item including the prompt, responsive to not receiving a positive user interaction with the prompt of the content item after the first initial display interval.

9. The system of claim 7, wherein the content delivery server is further configured to determine that the received first number of positive user interactions with the prompt of the content item after the first initial display interval divided by the total number of positive user interactions with the prompt of the content item is less than a predetermined first-display interaction ratio; and
wherein calculating the second initial display interval is performed responsive to the determination that the received first number of positive user interactions with the prompt of the content item after the first initial display interval divided by the total number of positive interactions with the prompt of the content item is less than the predetermined first-display interaction ratio.

10. The system of claim 7, wherein the target threshold first-display quantile comprises a predetermined first-display positive interaction ratio multiplied by the total number of positive user interactions with the prompt of the content item.

11. The system of claim 7, wherein the content delivery server is further configured to determine that the total number of positive user interactions with the prompt of the content item is greater than an optimization data threshold.

12. The system of claim 7, wherein the content delivery server is further configured to determine that the second initial display interval does not exceed an upper or lower boundary; and
wherein transmitting the content item including the prompt to the second computing device, after the second initial display interval, is performed responsive to the determination that the second initial display interval does not exceed the upper or lower boundary.

13. A non-transitory computer-readable storage medium storing instructions that when executed by one or more data processors, cause the one or more data processors to perform operations comprising:
streaming, to each of a plurality of computing devices, an application on behalf of each of the plurality of computing devices;
transmitting a content item including a prompt for downloading the application to each of the plurality of computing devices after a first initial display interval comprising a predetermined time between beginning streaming of the application and display of the prompt of the content item;
receiving a first number of positive user interactions with the prompt of the content item after the first initial display interval and a total number of positive user interactions with the prompt of the content item;
determining that a ratio of the first number of positive user interactions to the total number of positive user interactions exceeds a threshold ratio;
reducing the first initial display interval to generate a second initial display interval by multiplying the first initial display interval with a ratio of a target threshold first-display quantile divided by the first number of positive user interactions with the prompt of the content item after the first initial display interval, the second initial display interval calculated to be less than the first initial display interval based on determining that the ratio of the first number of positive user interactions to the total number of positive user interactions exceeds the threshold ratio;
streaming the application to a second computing device; and
transmitting the content item including the prompt for downloading the application to the second computing device after the second initial display interval, a positive interaction on the prompt at the second computing device directing the one or more data processors to cease streaming of the application to the second computing device after the second initial display interval thereby reducing consumption of resources by the one or more data processors.

14. The non-transitory computer-readable storage medium of claim 13, wherein execution of the instructions further cause the one or more data processors to:
retransmit the content item including the prompt to a subset of the plurality of computing devices after a second display interval comprising a second predetermined time between transmitting the content item including the prompt and retransmitting the content item including the prompt, responsive to not receiving a positive user interaction with the prompt of the content item after the first initial display interval.

* * * * *